Patented June 2, 1959

2,889,380
PRODUCTION OF 1,4-DICHLOROBUTANE

Edward E. Hamel, Niagara Falls, N.Y., assignor to E. I. du Pont de Nemours and Company, Wilmington, Del., a corporation of Delaware No Drawing. Application October 15, 1956
Serial No. 615,766

6 Claims. (Cl. 260—657)

This application, a continuation-in-part of my co-pending application, Serial No. 393,500, filed November 20, 1953, now abandoned, relates to the production of 1,4-dichlorobutane from tetrahydrofuran.

1,4-dichlorobutane is valuable as an intermediate in the production of nylon. An important commercial source of the material is from the reaction of hydrogen chloride with tetrahydrofuran:

(1) 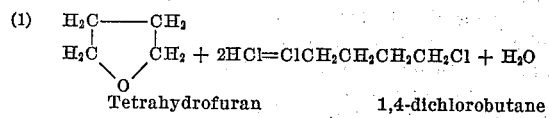

Tetrahydrofuran  1,4-dichlorobutane

This reaction also yields 4,4'-dichlorodibutyl ether as a by-product so that the crude 1,4-dichlorobutane may contain up to 10% by weight or more of this material. The formation of this by-product is indicated by the equation:

(2) 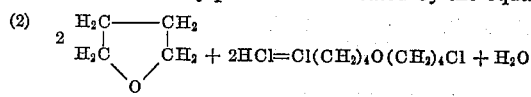

Prior art procedures for the preparation of dichlorobutane from hydrogen chloride and tetrahydrofuran have generally sought to obtain high yields of this product by (1) the use of anhydrous reagents to limit the amount of water in the reaction mixture, (2) the addition of dehydrating agents to combine with the water produced and (3) the use of reaction catalysts.

Trieschmann et al., German Patent 859,734 (December 15, 1952) employ anhydrous reagents alone and in the presence of a metal chloride catalyst such as bismuth chloride. Codignola et al., French Patent 1,045,827 (July 1, 1953) carry out a continuous gas-phase reaction with anhydrous reagents. Cass, U.S. Patent 2,218,018 (Oct. 15, 1940) uses a dehydrating agent such as sulfuric acid. Scott, U.S. Patent 2,491,834 (December 20, 1949) employs quaternary ammonium halide catalysts and Kroper, German Patent 859,884 (February 5, 1953) employs aqueous hydrogen chloride with bismuth chloride or sulfuric acid.

In general, processes employing catalysts and dehydrating agents are disadvantageous in that the catalysts are expensive. Also, product recovery problems are complicated by the use of both dehydrating agents and catalysts. Furthermore, all of these processes tend to give relatively high yields of the by-product, 4,4'-dichlorodibutyl ether so that the crude 1,4-dichlorobutane may contain over 4% by weight of this impurity.

The use of anhydrous raw materials and dehydrating agents in prior art processes is based on the premise that optimum yields are obtainable from a reaction yielding water when the mass action effect of the water is minimized by reducing its concentration in the reaction mixture. It has now been found that high yields of 1,4-dichlorobutane can be obtained in a process employing aqueous hydrogen chloride in the absence of added catalysts.

An object of the present invention is provision of a new and improved method for producing 1,4-dichlorobutane by the liquid phase reaction of tetrahydrofuran with aqueous hydrogen chloride. Another object is provision of a liquid phase process for producing 1,4-dichlorobutane from tetrahydrofuran and aqueous hydrogen chloride in which the product is readily separated as an upper organic phase in which it is the major constituent. A further object is provision of a process for producing 1,4-dichlorobutane from tetrahydrofuran and hydrogen chloride that will minimize formation of by-product 4,4'-dichlorodibutyl ether. A still further object is provision of a continuous process for the production of 1,4-dichlorobutane from hydrogen chloride and tetrahydrofuran by the aforesaid liquid phase reaction. An additional object is a method for producing 1,4-dichlorobutane which avoids the need for expensive catalysts and can be operated at a commercially acceptable pressure.

The above-mentioned and still further objects of the invention are achieved by an essentially non-catalytic process in which tetrahydrofuran is heated with an excess over the stoichiometrical amount of hydrogen chloride in the form of an aqueous solution containing not over 45% hydrogen chloride by weight at an autogenous pressure in the range of 50 to 150 lbs. p.s.i.g. (pounds per square inch gauge). Temperatures in the range 140° to 150° C. and pressures under 100 p.s.i.g. are preferred. Best results are obtained when the aqueous acid contains at least three moles hydrogen chloride per mole of tetrahydrofuran. The mole ratio of hydrogen chloride to tetrahydrofuran and the concentration of hydrogen chloride and water in the reaction mixture are critical since the success of the process is dependent upon the separation of product as a non-aqueous upper phase which can be readily decanted from the reaction mixture. These factors must be adjusted so that the concentration of hydrogen chloride in the aqueous phase of the reaction mixture does not fall below 20% by weight. For optimum results this concentration should be in the range 25 to 35% by weight. Under the preferred conditions, the non-aqueous product phase contains 1,4-dichlorobutane as a major constituent in approximately 95% yield. The 4,4'-dichlorodibutyl ether formed under these circumstances equals 1 to 3% by weight of the crude 1,4-dichlorobutane. The reaction is rapid and requires only about 10 to 30 minutes for completion.

A continuous process may be used to advantage if so desired. This is readily accomplished by feeding tetrahydrofuran and hydrogen chloride gas in a mole ratio of about 1:2 into the bottom of a reactor containing a large excess of hot aqueous 25 to 35% hydrogen chloride under autogeneous pressure at a temperature of 140 to 150° C. and decanting or flowing out the non-aqueous organic phase from the top of the reactor as formed together with aqueous phase containing one molecular proportion of water for each mole of 1,4-dichlorobutane which is the major constituent of the organic phase. This is readily accomplished by positioning an over-flow pipe at the level to which the reactor is initially filled with hot aqueous hydrogen chloride. The over-flow will then be equivalent to the combined volume of the aqueous and non-aqueous product formed by the reaction. These phases can then be subjected to distillation and decantation to separate unreacted tetrahydrofuran, 4,4'-dichlorodibutyl ether and aqueous hydrogen chloride from the 1,4-dichlorobutane produced. If desired, the tetrahydrofuran and the 4,4'-dichlorodibutyl ether can be recycled to the reactor. In carrying out this process, the hydrogen chloride feed should be adjusted to maintain the hydrogen chloride content of the aqueous product phase in the 25 to 35% range.

Numerous variations can be made in this process within the scope of the invention. Temperatures ranging from 120 to 170° C. may be employed. The concentration of hydrogen chloride in the aqueous phase of the reaction mixture may range from about 20% hydrogen chloride to 45%. However, since pressures in excess of 150 p.s.i.g. are commercially impractical, a limit to temperature and hydrogen chloride concentration is imposed. The stoichiometrical excess hydrogen chloride employed in the batch process should be equivalent to at least 3 moles hydrogen chloride per mole tetrahydrofuran, the preferred range lying between this value and 6 moles hydrogen chloride per mole tetrahydrofuran. Hydrogen chloride-tetrahydrofuran mole ratios of less than 3:1 give little or no 1,4-dichlorobutane. Hydrogen chloride-tetrahydrofuran mole ratios of over 6:1 give satisfactory yields but reduce the productivity of batch reactors to uneconomical levels since weight of product per unit volume of reaction space is low. In the continuous process, tetrahydrofuran may be added to 10–20 or even greater molar proportions of hydrogen chloride, the hydrogen chloride-tetrahydrofuran ratio being limited only by the rate of reaction or hold-up in a given reactor.

The by-products of the tetrahydrofuran-hydrogen chloride reaction include the intermediate tetramethylene chlorhydrin in addition to 4,4'-dichlorodibutyl ether. Tetramethylene chlorhydrin is a product of the equilibrium reaction:

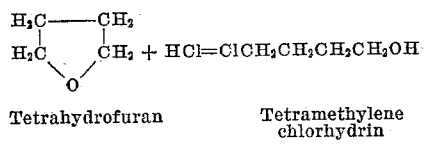

Tetrahydrofuran      Tetramethylene chlorhydrin

Reaction with additional hydrogen chloride converts this product to 1,4-dichlorobutane; autocondensation gives 4,4'-dichlorodibutyl ether. Because of its solubility in aqueous hydrogen chloride, tetramethylene chlorhydrin tends to accumulate in the aqueous phase and is kept to a minimum by employing excess hydrogen chloride. A low hydrogen chloride-tetrahydrofuran ratio may yield a single phase reaction mixture depending on the water content since tetramethylene chlorhydrin also increases the solubility of 1,4-dichlorobutane in the aqueous phase.

While some 4,4'-dichlorodibutyl ether is invariably formed by the process of this invention, the amount formed is kept to a minimum by the conditions employed. Temperature is an important factor. A batch preparation employing the preferred reagent proportions at 110° C. yields a crude dichlorobutane containing 25% dichlorodibutyl ether whereas the concentration of this by-product is about 2% when the reaction is carried out at 150° C.

Although only small amounts of by-product 4,4'-dichlorodibutyl ether and tetramethylene chlorhydrin are produced by the process of this invention, yield losses due to their formation can be avoided by recovery processes. On distillation, tetramethylene chlorhydrin in the aqueous hydrogen chloride phase is converted to tetrahydrofuran which can be recycled to the pressure reactor. 4,4'-dichlorodibutyl ether is hydrolyzed by hot aqueous hydrogen chloride to yield tetramethylene chlorhydrin which then reacts to give 1,4-dichlorobutane. Build-up of the ether in the reactor apparently reaches an equilibrium or steady state when its concentration in the feed reaches 2–3.4 weight percent. Consequently the material can be reworked if necessary by batch or continuous process. It is readily separated from 1,4-dichlorobutane by fractional distillation.

The preferred recovery technique of this process involves distillation of the mixed aqueous and non-aqueous product phases to remove tetrahydrofuran. The tetrahydrofuran obtained in this way includes unreacted tetrahydrofuran and tetrahydrofuran produced by the splitting of hydrogen chloride from tetramethylene chlorhydrin. Some 4,4'-dichlorodibutyl ether is also hydrolyzed during the tetrahydrofuran stripping yielding additional tetramethylene chlorhydrin which also contributes to the tetrahydrofuran recovery. Stripped non-aqueous product is then neutralized by washing with an aqueous alkali to remove hydrogen chloride, after which the 1,4-dichlorobutane is distilled leaving a still residue containing any unreacted 4,4'-dichlorodibutyl ether.

As previously pointed out, separation of the 1,4-dichlorobutane from the reaction of tetrahydrofuran and aqueous hydrochloric acid as an upper, non-aqueous organic phase is a critical feature of this invention. Experiments have demonstrated that the desired separation will take place if the concentration of hydrogen chloride in the aqueous phase of the reaction mixture is not less than about 20%, a 25–35% concentration being preferred for optimum yields. Separation of product as a lower phase will take place if the hydrogen chloride concentration is allowed to reach lower values but yields and reaction rates are unfavorable under conditions that would result in this situation. In this connection it should be pointed out that the factors determining the desired phase separation are extremely complex. The density of the aqueous and non-aqueous phases is dependent on their composition and the components involved include tetramethylene chlorhydrin, tetrahydrofuran and dichlorodibutyl ether as well as hydrogen chloride, dichlorobutane and water. Distribution factors and the differential effect of temperature on density are also involved. Data on phase separation of product mixtures in Table I shows that the critical hydrogen chloride concentration is about 20% by weight. In this table, tetramethylene chlorhydrin is designated as TMC.

TABLE I.—PHASE SEPARATION IN DICHLOROBUTANE PROCESS

| Exp. | Position of organic layer at— | | Separation of layers | Conc. in aq. phase | |
|---|---|---|---|---|---|
| | 150° C. | Room Temp. | | HCl | TMC |
| 1 | Bottom | Bottom | Sharp | 13.9 | 9.4 |
| 2 | Top | do | do | 21.8 | 13.0 |
| 3 | do | do | Fair | 19.8 | 12.2 |
| 4 | do | do | Sharp | 28.0 | 1.4 |
| 5 | do | do | do | 28.5 | 2.3 |

The concentration of the water in the reaction mixture is also critical as previously pointed out. Product separation and yields are controlled by the ratio of hydrogen chloride to water in the reaction mixture in conjunction with the other process variables. These water values will be in the desired range when the concentration of hydrogen chloride in the aqueous hydrogen chloride and the aqueous phase of the reaction mixture are maintained as previously indicated.

The invention may be understood in more detail from the examples which follow. In these examples, all percentages are by weight unless otherwise indicated.

*Example I*

This example shows results obtainable in batch preparations when the composition of the reaction mixture is near optimum and temperatures are varied.

A series of runs was carried out in separate sealed glass tubes at various temperatures under autogenous pressure. The temperature was maintained by inserting the tubes in a thermostated liquid bath. The tubes were agitated by shaking during the time allowed for reaction. Since the reaction rate decreases with temperature, longer heating periods were allowed for the lower temperatures. The composition of the reaction mixture in weight percent is indicated below together with the mole ratio of the reagents:

|  | Weight percent | Mole ratio |
|---|---|---|
| Tetrahydrofuran | 12.47 | 1 |
| Hydrogen Chloride | 33.91 | 5 |
| Water | 53.62 | 17.2 |

The above can be obtained by mixing 38.8% aqueous hydrogen chloride with tetrahydrofuran. It should be noted that this mixture contains 17.2 times the amount of water that would be formed by quantitative production of 1,4-dichlorobutane.

At the end of the reaction period, the tubes were cooled, opened and analyzed. In each case, a two phase liquid phase was obtained in which the upper phase consisted principally of 1,4-dichlorobutane plus a small amount of 4,4'-dichlorodibutyl ether. Pertinent data on these runs are shown in Table 2. The quantity of dichlorodibutyl ether produced is reported as the weight ratio of 1,4-dichlorobutane (DCB) to 4,4'-dichlorodibutyl ether (DDE). Tetrahydrofuran is abbreviated as THF in this table.

TABLE II.—REACTIONS IN THF:HCl:H$_2$O MIXTURE OF MOLE RATIO 1:5:17.2

| Run | Temperature (°C.) | Maximum pressure (p.s.i.g.) | Contact[1] time (minutes) | Mole Percent THF conversion | Product DCB:DDE ratio |
|---|---|---|---|---|---|
| 1 | 150 | 87 | 25 | 94.0 | 66.6 |
| 2 | 150 | 88 | 64 | 94.7 | 79.5 |
| 3 | 130 | 61 | 19 | 69.0 | 20.2 |
| 4 | 130 | 68 | 34 | 80.8 | 43.3 |
| 5 | 130 | 64 | 125 | 84.3 | 36.5 |
| 6 | 120 | 53 | 124 | 87.0 | 31.9 |

[1] This is the reaction time or the length of time the reactants were in contact and agitation was maintained.

These data show that the optimum reaction temperature is around 150° C. with a concomitant autogenous pressure of around 90 p.s.i.g. It should be noted that the yield of 1,4-dichloro-butane falls off as the temperature is decreased and that the yield of by-product ether increases even though a longer contact time was allowed at 120° C. The given contact time includes a short heating period and is consequently somewhat longer than the actual reaction time.

The final concentration of aqueous hydrogen chloride in the experiments at 150° C. was approximately 26%. These results indicate that reaction temperatures below 120° C. would be too low for practical purposes.

*Example II*

The experiments described in this and the two following examples show the effect of batch composition on the results obtained.

A series of runs was made following substantially the procedure of Example I except that a second reaction mixture was employed in which the mole ratio of THF:HCl:H$_2$O was 1:4:14.4. This corresponds to a weight ratio of THF:HCl:H$_2$O of 1.00:2.02:3.59. Significant data are shown in Table III.

TABLE III.—REACTIONS IN THF:HCl:H$_2$O MIXTURE OF MOLE RATIO 1:4:14.39

| Run | Temperature (°C.) | Contact time (minutes) | Mole Percent THF conversion | Product DCB:DDE ratio |
|---|---|---|---|---|
| 7 | 130 | 124 | 77.3 | 10.92 |
| 8 | 140 | 64 | 86.6 | 18.93 |
| 9 | 150 | 64 | 87.3 | 21.55 |

It will be seen that reducing the mole ratio of hydrogen chloride to tetrahydrofuran from 5:1 to 4:1, not only decreases the yield of 1,4-dichlorobutane but also increases the yield of by-product ether. The initial concentration of aqueous hydrogen chloride in this batch experiment was 36.1%. The final concentration of the aqueous hydrogen chloride phase in the experiment at 150° C. was approximately 23%.

*Example III*

The procedure of Examples 1 and 2 was substantially repeated with a mixture having THF:HCl:H$_2$O mole ratio of 1.00:3.00:10.81. Conversions in a 64 minute contact time at 140° C. and 150° C. were 58.8 and 77.6 mole percent 1,4-dichlorobutane respectively. The corresponding DCB:DDE weight ratios in the final products were 2.69 and 11.36 respectively. In these runs, the initial concentration of the aqueous hydrogen chloride was 36.1%. However, in the 140° C. run the lower aqueous phase had a concentration of approximately 22% whereas in the 150° C. run the aqueous phase was the upper phase and the hydrogen chloride concentration in this phase was about 16%.

*Example IV*

The procedure of the previous runs was repeated with a reaction mixture having a THF:HCl:H$_2$O mole ratio of 1:1:3.6. Conversions in 64 minutes contact time were 16.7 mole percent 1,4-dichlorobutane at 140° C. and 21.1 mole percent at 150° C. The respective DCB:DDE weight ratios were 1.54 and 1.80 respectively. In this experiment, the tetrahydrofuran was in excess and although the aqueous hydrogen chloride had an initial concentration of 36.1%, results were completely unsatisfactory in that the yields of 1,4-dichlorobutane were low and the crude product contained between 35 and 40% by weight of 4,4'-dichlorodibutyl ether.

*Example V*

This example illustrates an embodiment of the invention in a continuous process as carried out in plant scale equipment.

A glass-lined, cylindrical, steel pressure reactor was charged with approximately 10,000 pts. by weight of aqueous hydrogen chloride containing 26 to 28% hydrogen chloride by weight. This reactor was equipped with bottom inlets for feeding raw materials and a liquid product over-flow pipe slightly above initial level of the acid charge. It was also equipped with an outlet pipe situated at the top of the reactor for venting air and other gases. All outlets were equipped with pressure valves. Means for heating and cooling the reactor with steam were also included.

Following the initial charge of aqueous hydrogen chloride, the contents of the reactor were heated to 120° C. under autogenous pressure. Feeding with approximately equal weights of hydrogen chloride and tetrahydrofuran was then initiated while the temperature was allowed to rise to 140° C. The feed rate of tetrahydrofuran was gradually increased to 5900 pts. by weight per hour. At the same time, liquid over-flow was removed from the reactor, cooled, reduced to about eight pounds pressure and fed to a recovery still. Feed rates and temperatures were controlled so that the reactor pressure did not exceed about 100 p.s.i.g. and the aqueous phase leaving the reactor contained about 28% hydrogen chloride by weight. The adjusted hydrogen chloride feed rate was approximately 5910 pts. per hour. Gas equivalent to approximately 3 to 5% of the hydrogen chloride feed was recycled to a scrubber containing tetrahydrofuran feed.

The process yielded approximately 10,000 pts. per hour of crude, non-aqueous product phase containing 93% 1,4-dichlorobutane, 2% 4,4'-dichlorodibutyl ether and 5% unreacted tetrahydrofuran plus a small amount of hydrogen chloride. This amounts to a net yield of 97% 1,4-dichlorobutane with a dichlorobutane to by-product dichlorodibutyl ether weight ratio of 46.5:1.

The crude two-phase product mixture was fractionally distilled to remove tetrahydrofuran and hydrogen chloride for recycling. The organic phase was then decanted from the stripped product, washed with caustic to remove unreacted hydrogen chloride and purified by fractional distillation leaving 4,4′-dichlorodibutyl ether as a still residue.

The net yield of 1,4-dichlorobutane from the recovery process was almost quantitative since, as previously pointed out, distillation of the two-phase product converts tetramethylene chlorhydrin to tetrahydrofuran and hydrogen chloride and hydrolyzes some of the dichlorodibutyl ether to give tetramethylene chlorhydrin which is also converted to tetrahydrofuran and 1,4-dichlorobutane.

No mechanical agitation was needed in this preparation since sufficient mixing took place in the feeding process and excess agitation would interfere with efficient decantation of the non-aqueous product phase.

Having described my invention,

I claim:

1. A continuous process for the manufacture of 1,4-dichlorobutane comprising continuously feeding substantially anhydrous tetrahydrofuran and substantially anhydrous hydrogen chloride in a mole ratio of about 1:2 into the bottom of a liquid mixture comprising a large excess of 20 to 45% by weight hydrogen chloride in water at a temperature in the range 130° to 150° C. and an autogenous pressure of 50 to 150 p.s.i.g. in the substantial absence of a catalyst, while continuously decanting reaction product in the form of an non-aqueous upper phase containing 1,4-dichlorobutane as its major constituent and aqueous phase containing approximately one molecular proportion of water per mole of 1,4-dichlorobutane in said non-aqueous phase and not less than 20% hydrogen chloride by weight, sufficient hydrogen chloride being fed to the reactor so as to maintain the hydrogen chloride content of the aqueous phase in the aforesaid range.

2. The process of claim 1 to which is added the steps of fractionally distilling the two phase product mixture to remove tetrahydrofuran decanting the non-aqueous phase from the still residue, neutralizing said phase by washing with aqueous alkali to remove hydrogen chloride and fractionally distilling said neutralized non-aqueous phase to separate pure 1,4-dichlorobutane.

3. The process of claim 2 in which the autogenous pressure is 50 to 100 p.s.i.g. and the hydrogen chloride content of the aqueous phase in the reactor is maintained at 25 to 35% by weight.

4. A continuous process for the manufacture of 1,4-dichlorobutane comprising continuously feeding substantially anhydrous tetrahydrofuran and substantially anhydrous hydrogen chloride in a mole ratio of about 1:2 into the bottom of a liquid mixture comprising a large excess of 20 to 45% by weight hydrogen chloride in water at a temperature in the range 120° to 170° C. and autogenous pressure in the substantial absence of a catalyst, while continuously decanting reaction product in the form of a non-aqueous phase containing 1,4-dichlorobutane as its major constituent and an aqueous phase containing approximately one molecular proportion of water per mole of 1,4-dichlorobutane in said non-aqueous phase and not less than 20% hydrogen chloride by weight, sufficient hydrogen chloride being fed to the reactor so as to maintain the hydrogen chloride content of the aqueous phase in the aforesaid range.

5. A continuous process for the manufacture of 1,4-dichlorobutane comprising continuously feeding substantially anhydrous tetrahydrofuran and substantially anhydrous hydrogen chloride in a mole ratio of about 1 to 2 into the bottom of a liquid reaction mixture comprising a large excess of an aqueous 25 to 35% by weight solution of hydrogen chloride at a temperature in the range 130 to 150° C. and autogeneous pressure in the range 50 to 150 p.s.i.g. in the substantial absence of a catalyst, while continuously decanting reaction product in the form of a nonaqueous upper phase containing 1,4-dichlorobutane as its major constituent and aqueous phase containing approximately one molecular proportion of water per mole of 1,4-dichlorobutane in said non-aqueous phase and 25 to 35% hydrogen chloride by weight, sufficient hydrogen chloride being fed into the aforesaid reaction mixture to maintain the hydrogen chloride content of the aqueous phase in the aforesaid range of 25 to 35% by weight.

6. The process of claim 5 in which the molecular ratio of tetrahydrofuran to hydrogen chloride in the liquid reaction mixture is not more than 1:5.

References Cited in the file of this patent

UNITED STATES PATENTS

| | | |
|---|---|---|
| 2,084,710 | Spurlin | June 22, 1937 |
| 2,218,018 | Cass | Oct. 15, 1940 |
| 2,491,834 | Scott | Dec. 20, 1949 |

OTHER REFERENCES

Ser. No. 344,582, Trieschmann et al. (A.P.C.), published June 8, 1943.

UNITED STATES PATENT OFFICE
CERTIFICATE OF CORRECTION

Patent No. 2,889,380                                                  June 2, 1959

Edward E. Hamel

It is hereby certified that error appears in the printed specification of the above numbered patent requiring correction and that the said Letters Patent should read as corrected below.

Column 4, Table 1, third column thereof, under the heading "Room Temp." third item, for "do" read -- Top --.

Signed and sealed this 6th day of October 1959.

(SEAL)
Attest:

KARL H. AXLINE                                            ROBERT C. WATSON
Attesting Officer                                        Commissioner of Patents